United States Patent
Cuellar Jaramillo et al.

(10) Patent No.: US 12,050,718 B2
(45) Date of Patent: Jul. 30, 2024

(54) STRUCTURING DATA FOR PRIVACY RISKS ASSESSMENTS

(71) Applicant: Siemens Healthineers AG, Forchheim (DE)

(72) Inventors: Jorge Ricardo Cuellar Jaramillo, Baierbrunn (DE); Ute Rosenbaum, Kempten (DE); Santiago Reinhard Suppan, Maxhuette-Haidhof (DE); Shivani Jain, Yelenahalli (IN)

(73) Assignee: SIEMENS HEALTHINEERS AG, Forchheim (DE)

( * ) Notice: Subject to any disclaimer, the term of this patent is extended or adjusted under 35 U.S.C. 154(b) by 0 days.

(21) Appl. No.: 18/456,082

(22) Filed: Aug. 25, 2023

(65) Prior Publication Data
US 2024/0070324 A1    Feb. 29, 2024

(30) Foreign Application Priority Data
Aug. 26, 2022 (EP) .................... 22192421

(51) Int. Cl.
*G06F 21/62* (2013.01)
(52) U.S. Cl.
CPC .............. *G06F 21/6254* (2013.01)
(58) Field of Classification Search
CPC ................................ G06F 21/6254
See application file for complete search history.

(56) References Cited

U.S. PATENT DOCUMENTS

| | | | | |
|---|---|---|---|---|
| 11,657,307 B1* | 5/2023 | Bodapati | ................ | G06N 20/00 706/15 |
| 11,734,937 B1* | 8/2023 | Pushkin | ................ | G06V 30/10 706/12 |
| 2013/0198194 A1 | 8/2013 | Chen et al. | | |
| 2017/0177907 A1 | 6/2017 | Scaiano et al. | | |
| 2019/0354544 A1* | 11/2019 | Hertz | ................ | G06N 5/00 |
| 2023/0075884 A1* | 3/2023 | Jakobsson | ................ | H04L 9/50 |
| 2023/0078704 A1* | 3/2023 | Sun | ................ | G06F 21/6245 713/171 |
| 2023/0079455 A1* | 3/2023 | Dasgupta | ................ | G06F 16/345 707/739 |
| 2023/0095036 A1* | 3/2023 | Tripuraneni | ................ | G06Q 10/06398 705/7.42 |

(Continued)

OTHER PUBLICATIONS

Malik Imran-Daud et al: "Multivariate Microaggregation of Set-Valued Data", arxiv.org, Cornell University Library, 201 Olin Library Cornell University Ithaca, NY 14853, Apr. 4, 2022 (Apr. 4, 2022), Information Technology and Control, vol. 51, No. 1, pp. 104-125, XP091211746, DOI: 10.5755/J01.ITC.51.1.29826, http://dx.doi.org/10.5755/j01.itc.51.1.29826.

(Continued)

*Primary Examiner* — Stephen T Gundry
(74) *Attorney, Agent, or Firm* — Harness, Dickey & Pierce, P.L.C.

(57) ABSTRACT

A computer-implemented method for assessing a person re-identification risk in an application domain is provided. In the application domain, for each of a plurality of persons a corresponding personal record is stored in a database. Each record comprises a set of attributes. Each attribute comprises a corresponding attribute name and a corresponding attribute value.

20 Claims, 1 Drawing Sheet

(56) References Cited

U.S. PATENT DOCUMENTS

| | | | | |
|---|---|---|---|---|
| 2023/0140125 A1* | 5/2023 | Glesinger | G06V 20/41 704/9 |
| 2023/0152598 A1* | 5/2023 | Brebner | G02B 27/0977 359/627 |
| 2023/0153924 A1* | 5/2023 | Mason | G06Q 10/10 709/224 |
| 2023/0161946 A1* | 5/2023 | Bradley | G06F 16/22 715/205 |
| 2023/0162209 A1* | 5/2023 | Smith | G06V 20/20 |
| 2023/0177257 A1* | 6/2023 | Peleg | G06F 40/211 715/255 |
| 2023/0186023 A1* | 6/2023 | Saillet | G06F 16/36 704/9 |
| 2023/0205824 A1* | 6/2023 | Jablokov | G06F 16/3329 707/737 |
| 2023/0222542 A9* | 7/2023 | Kleber | H04L 67/535 707/737 |
| 2023/0244858 A1* | 8/2023 | Knudson | G06F 40/169 715/202 |
| 2023/0244875 A1* | 8/2023 | Venkateshwaran | G06Q 40/08 704/9 |
| 2023/0252224 A1* | 8/2023 | Tran | G06F 40/56 715/256 |
| 2023/0289137 A1* | 9/2023 | De Sousa Webber | G06F 40/279 |
| 2023/0334079 A1* | 10/2023 | De Sousa Webber | G06F 16/334 |
| 2023/0376693 A9* | 11/2023 | Galitsky | G06F 40/30 |

OTHER PUBLICATIONS

Wang Y. et al.: "A comparison of word embeddings for the biomedical natural language processing." Journal of biomedical informatics 87 (2018): 12-20.

Poostchi H. et al.: Cluster Labeling by Word Embeddings and WordNet's Hypernymy. In Proceedings of Australasian Language Technology Association Workshop, pp. 66-70.

Nema, et al., The DICOM Standard, 2015, 364 pages, Retrieved from the Internet: http://medical.nema.org/standard.html, on Feb. 4, 2015.

HL7: Standards for e-Health; Robert Seliger, Barry Royer, HL7 CCOW Co-Chairs; HL7: Standards for e-Health; (Internet).

Article 29 Data Protection Working Party; 0829/14/EN, WP216; Opinion May 2014 on Anonymisation Techniques; Adopted on Apr. 10, 2014; https://ec.europa.eu/justice/article-29/documentation/opinion-recommendation/files/2014/wp216_en.pdf.

Extended European Search Report dated Feb. 22, 2023.

* cited by examiner

STRUCTURING DATA FOR PRIVACY RISKS ASSESSMENTS

CROSS-REFERENCE TO RELATED APPLICATION(S)

The present application claims priority under 35 U.S.C. § 119 to European Patent Application No. 22192421.0, filed Aug. 26, 2022, the entire contents of which are incorporated herein by reference.

FIELD

Various examples generally relate to assessing privacy risks. Various examples specifically relate to computer-implemented methods for assessing a person re-identification risk.

RELATED ART

Information privacy is the relationship between the collection, processing and dissemination of data, technology, the public expectation of privacy, as well as the legal and political issues surrounding them. It is also known as data privacy or personal data protection. Personal data protection is challenging since it attempts to use data while protecting an individual's privacy preferences and personally identifiable information.

Data minimization and purpose limitation are the two the main principles of personal data protection. Any time that personal data is required for a particular explicit purpose, the amount of data collected or processed may be limited to what is necessary in relation to the purposes for which they are processed. This is particularly true for personal health information, which is subject to very strict privacy and data protection regulation, including the General Data Protection Regulation (GDPR) in the European Union (EU) or the Health Insurance Portability and Accountability Act (HIPAA) in the United States (US) of America.

Two techniques that contribute towards the principle of data minimization are pseudonymization and anonymization, where the data controllers or processors do not need to have access to the real identities or the real values of the data attributes of the data, but nevertheless the minimized data is still useful for the established purposes.

Generally, personal data relating to a person (also called a "data subject") may be considered as consisting of a record. Each record comprises a set of fields or attributes. Each of the fields or attributes is a pair of attribute name or tag (for example: the age of the person or his name) and attribute value (for example 33 years old or Peter Smith).

Pseudonymization is a data management and de-identification procedure by which personally identifiable information fields within a data record are replaced by one or more artificial identifiers, or pseudonyms. A single pseudonym for each replaced field or collection of replaced fields makes the data record less identifiable while remaining suitable for data analysis and data processing. Data anonymization is a process of removing personally identifiable information from data sets, so that the people whom the data describe remain anonymous.

In other words, much of the process of pseudonymization or anonymization (or any more general form of minimization) is to delete some fields or replace the exact values by more "abstract" versions of them. For example, instead of the age in years the attribute value may contain a range like 30-35 years or a pseudonym like PS2235. Those two procedures are also called deletion (or suppression) and abstraction, respectively.

The fields or attributes have different significance for the identification of an individual person. The name of the person identifies the individual not perfectly, but to a great degree, while the age does not. However, the combination of attributes may raise a problem: given the age, zip address and weight of a person, the probability of identifying the person can be very high.

As defined for example in GDPR Recital 26, the principles of data protection should apply to any information concerning an identified or identifiable natural person. On the other hand, the principles of data protection should therefore not apply to anonymous information, namely information which does not relate to an identified or identifiable natural person or to personal data rendered anonymous in such a manner that the data subject is not or no longer identifiable. In the case of anonymization, the minimized data should not relate to an identified or identifiable natural person nor to any other personal data rendered anonymous even if that data subject is not or no longer identifiable. In other words, anonymous data should not be linkable, directly or indirectly, to the subjects from where they come from. The idea is that the resulting "anonymized data" requires no further privacy protection and, in particular, does not require (after release) any particular mechanism involving the management of information and context. It should be impossible to infer information, i.e., to deduce with significant probability the value of an attribute from the values of a set of other attributes.

In various cases, much of the personal data is collected and stored using structured formats, e.g. as described above, as a set of records of attribute-value pairs. Important examples in the field of medical data are structured formats like DICOM (Digital Imaging and Communications in Medicine), the HL7 (Health Level 7), and the FHIR (Fast Healthcare Interoperability Resources) standards. They are used to store readings of vital signs, results of medical examinations, and in particular information obtained from imaging devices, such as CT (Computed Tomography), MRI (Magnetic Resonance Imaging), and ultrasound imaging. Within the DICOM standard, there are thousands of different attributes, and the list of defined attributes is expanding continuously.

In view of assessing the risk of identifying an individual the person, an attribute may be called critical if the attribute value can contain too much information, valuable for identifying the data subject. For data minimization a deny list (also called "Blacklist") may be used to specify which critical attributes should be eliminated during minimization. This approach may be very risky, as in the remaining attributes still much information can be present which has not been identified as being critical, alone or in combination with other attributes.

Furthermore, in view of the large amount of attributes, it may be difficult, error-prone, and burdensome to identify how the different attributes should be treated, in particular in a scenario of hundreds or thousands of attributes and the case that the attributes are varies or further attributes are added.

SUMMARY

Accordingly, there is a need for advanced techniques of assessing a person re-identification risk.

This need is met by the features of the independent claims. The features of the dependent claims define embodiments.

BRIEF DESCRIPTION OF THE DRAWINGS

Advantages and details emerge from the exemplary embodiments described below and on the basis of the drawings, in which.

DETAILED DESCRIPTION

Figure 1:
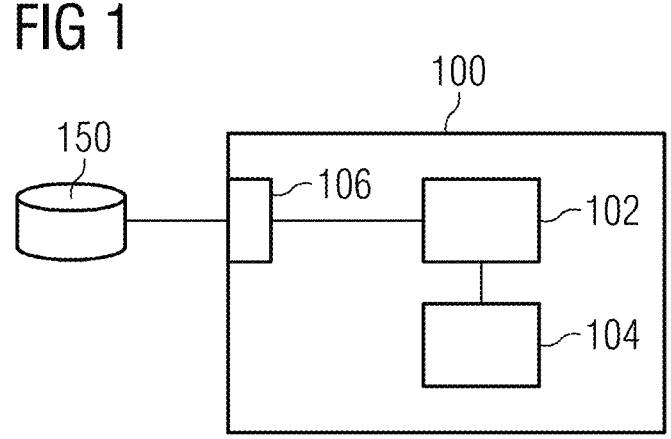
FIG. 1 schematically illustrates a device according to various examples.

Various examples of the disclosure generally relate to assessing a person re-identification. According to various examples, a computer-implemented method for assessing a person re-identification risk in an application domain is provided. In the application domain, for each of a plurality of persons a corresponding personal record is stored in a database. Each record comprises a set of attributes. Each attribute comprises a corresponding attribute name and a corresponding attribute value. According to the method, a plurality of text documents relating to the application domain is provided. The application domain may be any domain in which personal data is gathered, for example consumer behavior, travel and driving habits, employment, and especially medical and health care. For example, descriptions of corresponding standards, for example the DICOM standard in the medical and health domain, or specialist literature, for example corresponding entries in an encyclopedia like Wikipedia, may be compiled by a specialist and provided in electronic form as an input in a computer-based system. Based on the plurality of text documents, a plurality of text snippets are determined. A text snippet of the one or more text snippets is a text phrase or word contained in the plurality of text documents which is presumably relevant in the application domain. A text snippet may comprise for example a whole sentence, a part of a sentence or a single word. For example, word and phrase embedding techniques may be used to determine the text snippets, or text marks emphasizing particular words or phrases, for example hyperlinks, italics or bold letters, may be utilized to determine the text snippets. To each of the plurality of text snippets a label of a plurality of labels is assigned. The label is a word representing the text snippet. For example, the plurality of labels may be determined based on cluster labeling techniques applied on the plurality of text snippets or based on emphasized words in the plurality of text documents. Furthermore, a plurality of main objects in the application domain is provided. For example, the main objects may be provided by a specialist as a list in electronic form for input in the computer-based system. For example, in the medical and health domain, the main objects may include patient information, visit and examination information, institution information, device information, and/or analysis and result information. The plurality of text snippets and the plurality of labels are clustered based on the plurality of main objects. For example, the clustering may be performed by using cluster labeling techniques. The clustering is performed such that a plurality of clusters is obtained. Each cluster relates to one of the plurality of main objects, i.e. the text snippets of a specific cluster relate to one of the plurality of main objects. Within each cluster, the plurality of text snippets with related information are clustered in sub-clusters, and the labels of the clustered text snippets are assigned to the corresponding sub-cluster. For example, the text snippets of a specific sub-cluster may have a spatial or contextual relationship, or may have similar kind of information. Two text snippets may have a spatial relationship when they occur in a common sentence or are arranged close together, for example separated from each other by not more than a few words, for example not more than ten or fifteen words. The number of words separating the related text snippets can be an adjustable parameter of the method. As such, a sub-cluster may comprise a plurality of labels. Each attribute is assigned to one of the sub-clusters based on a similarity between (i) at least one of the attribute name and an attribute description of the attribute, and
(ii) the plurality of text snippets and the plurality of labels of the sub-clusters.

For each sub-cluster a corresponding re-identification risk is assessed based on value types assigned to the attributes and the attribute descriptions of the attributes assigned to the sub-cluster.

For example, based on the re-identification risk assigned to the sub-cluster, the attributes of the sub-cluster may be treated in the same way, for example a pseudonymization may be applied. As a result, also attributes which individually viewed may appear to be not critical in view of a re-identification risk, but may be critical in combination with other attributes, may be grouped in one sub-cluster and treated accordingly to avoid re-identification. Furthermore, new attributes can be easily and automatically included in the method such that assessment of the re-identification risk can be performed at low effort and at least partially automated.

In various examples, the method further comprises adapting the value types assigned to the attributes and re-assessing for each sub-cluster a corresponding re-identification risk based on the adapted value types and the attribute descriptions of the attributes assigned to the sub-cluster.

A value type of an attribute may be defined in different ways. For example, the value type of the attribute "age of a person" may be defined as the age in years, i.e. as an integer value, or as an age group, i.e. as an enumerated value defining for example a plurality of age groups like 0-4 years, 5-10 years, 11-15 years, 16-20 years, 21-25 years, and so on. Another value type may define a plurality of age groups with another granularity or age groups which cover ranges of different sizes, for example 0 to 20 years, 21 to 30 years, 31 to 40 years, 41 to 50 years, 51 to 60 years and above 60 years. Likewise, the value type of the attribute "address of a person" may be defined as the exact address including country, city (for example via ZIP Code), street and house number. Another value type of the attribute "address of a person" may include merely the country and the city. Yet another value type of the attribute "address of a person" may include ranges in latitude and/or longitude. By adapting the value type of an attribute, the re-identification risk may vary. For example, by changing the granularity of the age grouping, the number of persons assigned to an age group and thus the number of persons assigned to a sub-cluster comprising the "age" attribute may vary such that the re-identification risk may also vary. Adapting the value type of an attribute may have the goal of ensuring that the number of people per cluster is within a reasonable range, i.e., a cluster contains enough persons to have low re-identification risk, yet has a granularity that allows for meaningful data correlation.

In various examples, the step of assigning the attribute to a sub-clusters comprises determining, for each sub-cluster, a semantic similarity measure between
  (i) at least one of the attribute name and the attribute description of the attribute, and
  (ii) the plurality of text snippets and the plurality of labels of the sub-cluster.

The attribute is assigned to the sub-cluster for which the greatest semantic similarity measure is determined. Semantic similarity is a metric defined over a set of documents or terms, where the idea of distance between items is based on the likeness of their meaning or semantic content as opposed to lexicographical similarity. Mathematical tools may be used to estimate the strength of the semantic relationship between units of language, concepts or instances, through a numerical description obtained according to the comparison of information supporting their meaning or describing their nature.

In particular in the context of medical and health data, determining the text snippets may comprise determining text snippets relating to at least one of:
  a clinical domain,
  an object of the clinical domain,
  an activity of the clinical domain, and
  a type of information collected in the clinical domain.

A clinical domain may mean the categories of the various types of health care services provided to patients. A clinical domain may relate to a particular topic, as: musculoskeletal disorders, trauma, cancer, stroke, mental health, diabetes, etc. For example, the text snippets may be determined such that they relate to a specific clinical domain, for example a magnetic resonance (MR) examination of specific areas like knee, pancreas, breast, or brain. Objects of a clinical domain may relate to specific organs or bones in the clinical domain. Activities of a clinical domain may define actions performed in connection with the clinical domain, for example consultation of a doctor, hospital stay, and examinations performed. Types of information to be collected in a clinical domain may comprise for example examination results, data from a laboratory, images of an ultrasound, X-ray or MR examination. The text snippets may be determined such that they comprise text snippets of the provided text documents relating to each of the above described aspect.

For accomplishing this, determining the text snippets and assigning the labels may be performed by machine learning techniques with the plurality of text documents as an input, thus obtaining a cluster for each main object.

The method may comprise a step of removing a particular sub-cluster when no attributes are assigned to that particular sub-cluster. In further examples, a particular sub-cluster may be removed when the number of attributes assigned to the sub-cluster is below a target, i.e. the sub-cluster is too small. The predefined target number of sub-clusters may be in the range of 1 to a maximum number in the order of 20-100. However, if a sub-cluster is smaller than the target and is clearly separated (has a large distance) from all other ones, it may still be kept. It is clear that the attributes assigned to a sub-cluster which is to be removed may be assigned to another sub-cluster. The target may be sub-cluster specific, i.e. some sub-clusters may not be allowed to be removed even if they contain very few attributes.

In various examples, two sub-clusters may comprise attributes with high semantic similarity. Therefore, the method may comprise a step of merging a first sub-cluster of the sub-clusters and a second sub-cluster of the sub-clusters when a semantic similarity measure between the attributes assigned to the first sub-cluster and the attributes assigned to the second sub-cluster is greater than a predefined threshold. For example, a semantic similarity measure may be defined in a range from 0 to 1, where 0 signifies very low similarity and 1 signifies very high similarity. The predefined threshold may be in the range of 0.9 to 1, for example the predefined threshold may have a value of 0.98.

According to various examples, the plurality of text snippets and the plurality of labels are clustered, within each cluster, such that each sub-cluster comprises text snippets and labels having a semantic similarity measure above a threshold. The threshold is selected such that the number of sub-clusters is in a predefined range. For example, the predefined maximum number of sub-clusters is 20 to 100. In further examples, the desired number of sub-clusters can be a target value for the used clustering algorithm. For example, clustering the plurality of text snippets with related information in sub-clusters may consider a predefined target number of sub-clusters. A cost function may indicate a higher cost for a clustering resulting in a number of sub-clusters deviating from the target number of sub-clusters. Thus, a desired number of sub-cluster may be achieved, at least approximately.

In various examples, the method comprises a step of assessing the assignment of the attributes to the sub-clusters by verifying whether a same data minimization algorithm is applicable to the attributes assigned to one sub-cluster. The goal of this assessment is to address the re-identification risk. For all attributes in the sub-cluster, a same or similar data minimization algorithm should be available. Similar data minimization algorithms may differ only in different parameters for different value types. If this cannot be achieved with the determined sub-clustering, this is a clear sign that the attributes should be in different sub-clusters, and the step of assigning the attributes to the sub-clusters may be repeated with a different metric or parametrization for the semantic similarity thus obtaining a different sub-clustering.

According to various examples of, assigning the attributes to the sub-clusters is performed by machine learning techniques with (i) at least one of the attribute name and the attribute description of the attributes, and (ii) the plurality of text snippets and the plurality of labels of the sub-clusters as an input. The machine learning techniques may comprise a supervised machine learning methods including a manual check to check the actual content of at least some of the sub-clusters.

Various examples of the present application relates to an apparatus for assessing a person re-identification risk for a "project" in an application domain in which for each of a plurality of persons a corresponding personal record is stored in a database. Each record comprises a set of attributes. Each attribute comprises a corresponding attribute name and a corresponding attribute value. The apparatus may be a computer, workstation or server and comprises at least one interface and a computing device. The computing device is configured to receive via the at least one interface a plurality of text documents relating to the application domain, and to determine, based on the plurality of text documents, a plurality of text snippets. A text snippet of the one or more text snippets is a text phrase or word contained in the plurality of text documents which is presumably relevant in the application domain. The computing device is further configured to assign to each of the plurality of text snippets a label of a plurality of labels. The label is a word representing the related text snippet. The computing device receives via the at least one input unit a plurality of main objects in the application domain. The plurality of main objects may be provided by an input file.

The computing device is further configured to cluster the plurality of text snippets and the plurality of labels based on the plurality of main objects for obtaining a plurality of clusters. Each cluster may be assigned to one of the plurality of main objects. Within each cluster, the computing device may cluster the plurality of text snippets in sub-clusters and assign the labels of the clustered text snippets to the corresponding sub-cluster. The text snippets may be clustered based on their contained information, i.e. text snippets with related information are within one sub-cluster. For each attribute, the computing device assigns the attribute to one of the plurality of sub-clusters based on a similarity between
  (i) at least one of the attribute name and an attribute description of the attribute, and
  (ii) the plurality of text snippets and the plurality of labels of the clusters.

The computing device is also configured to assess, for each sub-cluster, a corresponding re-identification risk based on value types assigned to the attributes and the attribute descriptions of the attributes assigned to the sub-cluster.

Further examples relate to a computer program product comprising computer readable program code that is configured to cause a computing device to execute steps of the above described method.

A computer-readable recording medium is configured to store therein a computer program product, which comprises a computer readable program code that is configured to cause a computing device to execute steps of the method described above.

Various examples of the disclosure relate to machine learning techniques. Machine learning techniques may comprise supervised learning and/or unsupervised learning. Unsupervised learning may include data mining and clustering techniques. In particular, in view of the examples described above, machine learning techniques may be optimized by repeating some steps, for example the clustering and the assignment of the attributes to the sub-clusters with modified parameters, for example parameters relating to the semantic similarity. A manually provided quality parameter concerning for example the result of the clustering, attribute assignment or re-identification risk assessment may also be feedback in a supervised machine learning technique.

It is to be understood that the features mentioned above and those yet to be explained below may be used not only in the respective combinations indicated, but also in other combinations or in isolation without departing from the scope of the invention.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

It has been found that analyzing the re-identification risk of a project may benefit from structuring the data of the project into clusters and sub-clusters in such a form that
  the re-identification can be estimated and analyzed easily,
  decisions can be taken about what clusters of sub-clusters can be kept, and
  how the data values of the clusters and sub-clusters can be abstracted (generalized or suppressed) to obtain an acceptable re-identification risk and a targeted k-anonymity level, as described in the next paragraphs.

From an anonymization point of view, data can be distinguished as direct identifiers, quasi-identifiers, and other information. Direct identifiers often uniquely identify the patient without further information. Quasi-identifiers alone do not identify a patient, but in combination with other information contribute to singling out a patient. Therefore, it is important to recognize which fields or information represent quasi-identifiers, and their re-identification risk carefully estimated.

The general approach to achieve relative anonymization may be as follows:
  No direct patient identifiers are kept.
  No information about the institution is kept in clear text in the DICOM files.
  The information necessary for evaluating the data should be kept to the minimum possible.
  Further information about e.g., related lab results may be added if needed, but without identifiers.

Generally, personal data relating to a person or patient may be considered as consisting of a record. Each record comprises a set of fields or attributes. Each of the fields or attributes is a pair of attribute name or tag and attribute value.

The re-identification risk may be measured by k-anonymity. k-anonymity is a property possessed by certain anonymized data. For example, a release of data is said to have the k-anonymity property if the information for each person contained in the release cannot be distinguished from at least k−1 individuals whose information also appear in the release.

In order to obtain k-anonymity for a reasonable value of the parameter k, not only the quasi-identifiers are generalized or obfuscated to obtain sub-clusters of a chosen size, but also the possibility of using the sensitive information (like the pixel data) is considered. Other factors that are analysed and affect the re-identification risk are: the coverage of the hospital (what is the size of the population of possible patients), the amount of studies performed in this hospital (the lower this number, the easier is to re-identify a patient) and the completeness of the number of studies in the collaboration (the proportion of studies that are used for the collaboration over the total of available studies; the lower the completeness, the more difficult to re-identify a patient).

In the following, first an overview of some relevant aspects of re-identification risk analysis will be given and then embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

Data is the basis of all digitization activities and the basis for the development of new and improved products. In the healthcare sector in particular, digitalization is creating enormous opportunities, for example through developments of artificial intelligence (AI), which helps doctors with decision-making processes or automates the safe operation of medical devices. Therefore, many projects in this area obtain such data and process this data, e.g. store, analyze, evaluate or correlate this data. However, such data may include personal health information which is subject to very strict privacy and data protection regulation. There is a need to avoid re-identification of a person/patient based on the data.

It has been found that different types of examinations, e.g., scan of head vs. scan of intern organs, differ substantially in re-identification risk. Further, context information like the catchment area of a hospital or the amount and completeness of studies, have an additional impact on the re-identification risk.

The techniques described herein organize the information of an examination in different re-identification risk "main objects" and provides guidance for data minimization operations. The evaluation whether data can be considered anonymous or not, may be based on the criteria of singling out, linkability, and inference, defined by Article 29 Data Protection Working Party "Opinion 05/2014 on Anonymisation Techniques". It may also consider the elements set out in Recital 26 of the GDPR such as costs, amount of time and the reasonable likelihood of a re-identification attempt.

Clinical data may be obtained from DICOM studies generated during clinical workflows with the purpose of developing and improving medical products, procedures for diagnosis and/or treatment. The used DICOM studies shall be k-anonymized for reducing the re-identification risk.

In the following, reference will be made mostly to data stored according to DICOM standards, i.e. data from a DICOM study. However, it is clear that the described techniques are not restricted to DICOM studies, but may be applied to any other kind of structured data comprising the above described personal data.

The data minimization concept may be based on an allow list. The allow list may specify which tags of the DICOM study are kept and which minimization operations are performed on them. The operation describes whether a tag is kept unmodified or, if some modification is done, e.g., the preciseness of the value is reduced, or the value is replaced by a random value. All tags not contained in the allow list may not be kept during data minimization.

The DICOM standard itself defines currently about 5000 different tags. New versions of the standard including new tags to support new modalities and use cases are published multiple times each year. Furthermore, vendors can define their own private tags.

Usually, so-called deny list approaches are used to remove tags that contain identifiable information. Any tag that is not listed in a deny list is not modified.

The DICOM standard itself contains a list ("Confidentiality Profile") which currently defines about 450 tags considered to contain identifiable information.

The techniques described herein propose a more secure approach using an allow list with defined operations on the content of each DICOM tag. That means, that only the tags contained in the allow list are kept using the defined data reduction operation during data minimization. All tags not listed in the allow list are not kept. This is similar to the security approach for declarative access control: only those actions are allowed that are explicitly specified.

Also, from a privacy point of view, this approach is much more robust. The allow list ensures that only relevant and expected data are available after minimization.

However, such approach may require a large effort to compile and maintain the allow list for thousands of defined tags. It would be much more convenient just to remove known tags defined in the DICOM standard that might contain personal data.

DICOM tags may comprise thousands of commonly used DICOM tags defined by the DICOM standard plus private DICOM tags in the same order of magnitude. The DICOM tags may be grouped according to main objects in clusters and each cluster in sub-clusters. The main objects group the different kinds of information within a DICOM study, e.g., information about the institution, the device used, the patient itself, and the parameters and measurements within the examination. Within each of these clusters, sub-clusters are defined that group tags with similar re-identification risk.

The descriptions of the tag content as specified in the DICOM standard and the value representation (VR), e.g., integer value, pre-defined code string, text, are to be considered. DICOM tags with VR text, whose content can be defined by the operator of the device may be considered with special care. Usually, these tags do not contain patient related information but there is a residual risk that these tags hold quasi-identifiers. Therefore, only the free text elements should be kept that are known to be used for a certain purpose and needed because they are commonly used for this purpose. The recommendations of the DICOM standard in the Confidentiality Profile may be considered as well.

Private tags are defined by a vendor (i.e., manufacturer) of a modality. Each vendor publishes DICOM Conformance Statements (DCS) containing a list with some of his private tags, including the tag name and the value representation. Not all the private tags are published by the vendor. The DICOM standard has listed several private tags as "safe" attributes in the Confidentiality Profile. That means, these private tags are considered to be only technical information.

For the evaluation of private tags, DICOM conformance statements may be used as base for information. Recommendations from the DICOM standard may be considered but not as only source of information. The evaluation may consider especially the VR which gives a hint on the values of a tag and the potential for contributing to the re-identification risk. For tags containing strings and tags containing Binary Objects further information may be required.

For the re-identification risk analysis, the tags within a DICOM study may be clustered according to the main object they belong to.

The following clusters may be defined:

| Cluster | Description | Re-identification aspects |
|---|---|---|
| Patient | All information directly related to the patient. | This information relates to direct identifiers or quasi-identifiers which can be used to single out a patient. |
| Institution | Information about the institution (hospital) that performed an examination, e.g. imaging procedure | Knowing the institution helps narrowing down the set of possible patients. |

-continued

| Cluster | Description | Re-identification aspects |
|---|---|---|
| Device | Information about the device used. | Knowing the device might allow identifying the institution and thus might help narrowing down the set of potential patients. |
| Examination | All information about the imaging acquisition itself, the pixel data, and results of post-processing steps as annotations. | Pixel data is a major aspect for re-identification, but also free-text fields or the date of the examination. |
| Others | All other data that have been analyzed and do not fall in any of the main objects above | The data is either not kept or generated by the minimization tooling. Thus, they do not contribute to re-identification. |

For each cluster, sub-clusters may be identified that group DICOM tags with similar information related to re-identification. For all tags in a sub-cluster the same kind of data minimization operation may be applied. The applied data minimization may always remove direct patient identifiers. Nevertheless, the resulting information may still be a quasi-identifier. In this case, the re-identification risk based on this sub-cluster is estimated and a rationale may be given.

In the following Sections, the identified sub-clusters are discussed regarding their content, the data minimization applied, and the resulting risk of re-identification. The following information may be considered for each sub-cluster:
 Group of DICOM tags with similar information related to re-identification;
 Short description of cluster;
 Data minimization: Based on the project requirements, each project will define a set of data minimization operations, which ensure that only the proper minimal amount of data is kept;
 Re-identification risk: Evaluation of re-identification risk after applying data minimization operations;
 Quasi-identifier: Indicates whether information of this sub-cluster may be considered as Quasi-identifier or as non-personal identifiable information.

The cluster "patient" contains all information directly related to the patient. This cluster is divided into sub-clusters that differentiate different types of fields (tags). The criteria for constructing those sub-clusters may appear somewhat arbitrary, but criteria may be the following: two different types of data (tags/fields) are placed into different sub-clusters if they pose different re-identification risks (given the rest of data that should be collected). More precisely, two tags may be kept together in the same sub-cluster only if:
 their provenance is similar,
 they pose a similar risk regarding the re-identification of the study and
 if they are to be collected with the same frequency for the same types of studies: tags in the same cluster are kept all quite often or rather seldom or they should be kept for particular types of studies.

The following sub-clusters may be identified concerning the cluster "patient": identifiers, information, and characteristics.

Patient identifiers, such as patientID (identifier of the patient used by the hospital) or patients' name could be replaced with empty values, the same constant value, or random values. Not keeping the tags may not be possible, e.g. as these tags are required to be compliant with the DICOM standard.

For example, some projects may require distinguishing different patients. Examples are projects that develop AI algorithms. Other examples are projects in which the progress of a health condition is analyzed over time.

Concerning patient information, DICOM studies might contain much more information about the patient such as address, phone number, date of birth, names of relatives. DICOM tags containing this type of information have been assigned in this sub-cluster.

Concerning patient characteristics, DICOM studies may contain many different characteristics of the patient as gender, age, weight, size. All these characteristics are quasi-identifiers of the patient.

Another aspect to be considered is the set of data. If a project has several or all DICOM studies of a hospital for a specific disease, singling out and inference might become a threat for re-identification. If someone knows that his neighbor has a bone fracture, was in a particular hospital (institution), is 86 years old and in the data set patients with bone fractures of the last 3 years there is only one 86-year-old patient, then singling out with a high probability is possible.

If all DICOM studies of a certain subgroup are part of a project, a project specific assessment is needed taking this into account for singling out and inference considerations.

Concerning the patient characteristics, it has been found that projects may individually need further patient characteristics. Examples are:
 Research about lung diseases often requires the smoking status;
 Research on applied pharmaceuticals, like contrast medium, may need the weight of the patient;
 For some medical products, proof of tests with different ethnicities may be required.

The main object "institution" contains all information about the institution (hospital) that performed examinations, e.g. the imaging procedure of the DICOM study.

The following sub-clusters may be identified concerning the main object "institution": identifiers, region, information, and personnel.

Information about the institution is an important quasi-identifier as it helps narrowing down the set of potential persons who have been the subject of the imaging procedure via their location.

Therefore, DICOM tags may be carefully analyzed to avoid any hints to the institution.

Concerning institution identifiers, e.g. the name of the institution, such information may generally not be required in clear text.

For several reasons, it may be required to be able to distinguish different institutions. There are projects with different involved institutions. Being able to distinguish the source of the data enables calculating how much data is provided by the different institutions. For example, for the release of medical devices there are legal requirements for the used test and validation data that can be much easier fulfilled if data can be linked to a specific institution.

For example, a random value may be used to represent a particular institution in all studies. For different projects new random values may be generated (which, being random and not too short, can be safely assumed to be different for all institutions and all projects).

The random value for the institution alone does not provide useful information to singling out a patient. But, within a project, the information about the institution may be available even if no information is contained in the DICOM file itself.

If the institution is known, the catchment area gives hints about the set of potential patients. The size of this set depends on the institution. A small hospital in rural areas may only provide service to 100.000 people. A small hospital in a rural area, specialized on certain diseases, will process a much larger number of patients. These patients might also come from other areas (e.g., in case of specialist services). If the institution is a hospital chain or a group of clinics, the catchment area will be much larger and encompass millions of persons.

The number of possible patients derived from the catchment area of the institution may be estimated for each project as this number is an important factor in estimation of singling out risk.

DICOM studies contain other institution information that helps identifying the institution. Examples are address of the institution, the names of the departments, names of stations. This information is not necessarily needed within the research projects. As it increases the risk that the institution can be identified, this data may not be kept.

The region of the institution may be supported. The calculated regions may be large enough (e.g., EU, Asia, . . . ) so that there is no increased re-identification risk. Thus, the value is not considered a quasi-identifier.

DICOM studies may contain names or identifiers of institution personnel or other persons involved in the imaging acquisition or treatment of the patient. This is personal data is usually not needed. It also increases the risk of figuring out the institution. Therefore, this data may not be kept.

DICOM studies may contain other further tags that might contain information about the institution. Examples are tags, whose content are text fields that can be specified by the institution. In case of doubt, these tags are assigned to this cluster and not kept making sure that no unintended content is contained in the minimized DICOM studies.

The cluster "device" contains all information about the device(s) that generated the DICOM study.

The following sub-clusters may be identified concerning the cluster "device": identifiers, general information, specific information, and free text.

For medical devices, manufacturers know which device is located on which customer-site. This mapping may be stored on various databases. Even though this information is not available for everyone, it is assumed that a link between device and institution may be possible. Therefore, detailed information about the device is considered as quasi-identifier.

Concerning device identifiers, DICOM studies contain unique identifiers of the device, e.g. a device used for imaging acquisition. Examples are the serial number or identifiers of the components of the device. This information may allow attributing the device to an institution and thus is not kept.

Several tags containing device identifiers are so-called "Type 1" tags, i.e., they should be present in a DICOM study for DICOM conformance. Therefore, these values may be replaced with a random number.

If required for the project, assigning a consistent value to the device identifiers may be supported (either by a mapping table or using a keyed hash where the key is generated for this research project in the sphere of the customer).

From re-identification risk analysis point of view, keeping a consistent random value allows knowing that the same device has been used for imaging acquisition. This does not yield useful information for re-identification.

The serial number itself is considered a quasi-identifier as a manufacturer knows which device is installed at which location. Knowing the location, the possible catchment area is reduced and thus the number of potential patients will be much smaller. Therefore, device identifiers are not kept.

General information about the device and its subcomponents (e.g. detector, coils) as manufacturer information and model name may be needed for all kinds of analysis.

Many projects should ensure that test data is based on devices from different vendors. An example is the development of AI based analysis of pixel data for automatic annotations. Regulatory authorities require tests among many different devices for approval of the medical product.

The information assigned to this sub-cluster is so general, that in general many devices of each model are in use. There are two exceptions. For new device models when introduced into a market there will be only few customers. Also, some high-end devices are not widely in use.

There are no public available lists which hospital is operating which device model. Some hospitals publish information which device models they use, especially in case of high-end devices. The manufacturer of a device has complete lists of the deployed devices at customers.

The general device information is considered a quasi-identifier because under certain circumstances it can be used to restrict the set of hospitals operating the device model.

Therefore, the device model information does not directly contribute to singling out a patient, but it may facilitate narrowing down the hospitals using the device.

In projects not focused on dedicated devices, data from new device models will be a rare situation and the effort for trying to single out a patient using this may be considered to be very high related to the success rate.

This sub-cluster "Device—Specific Information" encompasses more detailed information about the device, e.g., software version or application version. There might be many different versions in use. The current versions may be available within a manufacturer's installed-base database and accessible by many different employees. Therefore, knowing this information would allow narrowing down the institutions considerably. In contrast to the general device information, this more specific information is considered a quasi-identifier.

Some projects will need this information. Examples are research projects that test new software components. In this case, the manufacturer may know the device and thus the catchment area of the device will need to be considered in a project specific risk assessment.

Concerning device dates, DICOM studies contain date stamps that are related to the device itself and are independent of the imaging acquisition date. These are dates of the device maintenance especially device configuration and calibration dates.

The maintenance dates and calibration dates may be available in databases monitoring the devices. The date stamps alone are only technical information. Therefore, these date stamps are not kept or replaced by a fixed or random value.

Concerning the device sub-cluster "Free Text", DICOM studies may contain various information about the device that can be defined by the operator of the device. Examples are institution specific names for the device. These free text DICOM fields might contain information about the institution. To avoid this risk, free text values or comments are not kept.

The cluster "Examination" contains information about examinations itself, e.g. imaging acquisitions, and post-processing steps as annotations.

The following sub-clusters may be identified concerning the cluster "examination": identifiers, dates, procedure, text, pixel data, technical data, free text, and others.

DICOM UIDs (unique identifiers for examinations) describe the relationship of different parts of the imaging procedure. Each DICOM UID is composed of two parts, an <org root> and a <suffix>: UID=<org root>.<suffix>. The <org root> portion of the UID uniquely identifies an organization, e.g., the manufacturer of the device. The <suffix> portion of the UID is also composed of several numeric components and shall be unique within the scope of the <org root>.

The "Study Instance UID" is a worldwide unique identifier of the DICOM study itself. The "Series Instance UID" identifies the series (usually one scan), and the "SOP Instance UID" is unique for a single file (e.g., one slice).

These DICOM UIDs are quasi-identifiers as they allow identification of the DICOM study, not directly of the patient. To provide uniqueness, the suffix part often contains detailed device information and date or time stamps.

Therefore, DICOM UIDs may be modified to reduce the re-identification risk. This modification should be consistent such that the relations within a DICOM study is retained and that the result is compliant with the DICOM standard.

Therefore, all UIDs may be modified as followed: The root is replaced with a vendor specific root for the data minimization use case, and the suffix is generated using a keyed hash of the original UID. The key is generated for the research project within the institution. This approach retains the required uniqueness of the UIDs within a DICOM study.

The result is not considered a quasi-identifier as relation to the patient is no longer possible.

Concerning examinations, a DICOM study contains many different date/time stamps. The tags contained depend on different factors, e.g., the imaging device being used, but also the configuration of the whole imaging procedure within an institution, e.g. date/time stamps related to an imaging acquisition.

Further date stamps within a DICOM study are related to the hospital stay or to the device itself. These date stamps are assigned to different sub-clusters and handled differently.

The date of the examination is a quasi-identifier as the actual date of an examination might be known. The timeframes between the different steps are important for all analysis of the DICOM studies. Therefore, the date stamps may be modified in such a manner that the time distances within a study are kept.

Modifying (shifting) the timestamps does not contribute to lowering the re-identification risk considerably. The exact time stamp within an examination is usually unknown.

One approach may be to shift the date of all studies by the same random value or let the user choose a timeframe for shifting. This approach is risky for different reasons:

If one study could be somehow identified, then the shift value for this study is known, and in consequence the shift value for all other studies is known as well.

The day of the week and some public holiday might be derived from the frequency of studies.

User input usually is not a reliable source for random values that is needed here.

A more appropriate approach for data minimization of the date may be to discard the date distribution pattern completely. This can be done by setting all dates to one fixed value (e.g., the first day of the year) or shifting each single study randomly with a random value large enough. The drawback is, that longitudinal information will be lost.

Some research projects analyze the different examinations of the same patient, e.g., to analyze the progress of a disease as cancer. For these projects, longitudinal information, i.e., the distances between different examinations may be needed. Longitudinal information can only be kept if the patientID is modified consistently, i.e., different patients can be distinguished. In this case, all studies belonging to the same patient are shifted the same number of days.

With a shift of the date of e.g. one to three years, the re-identification risk based on the study date alone is considerably reduced. All patients within a 3-year time frame need to be considered for the set of possible patients.

The risk related to retaining longitudinal information depends on the type of project. If all patients are examined at the same date distances, the examination pattern is not unique for a single patient. Effects of retaining longitudinal information may be evaluated per project.

Use case analysis showed that R&D projects use similar longitudinal information for each patient, e.g., several examinations within short distances (hours or some days) to analyze effects of contrast medium applied, or examinations with roughly fixed distances (e.g., all 6 month) to monitor the progress of a disease. In these cases, all the patients have the same pattern of examinations. Therefore, this pattern helps narrowing down the patients as it reveals that several examinations are done, but this pattern is the same. Thus, in these cases, the risk that singling out is possible, is considered negligible.

If longitudinal information is kept, a project specific assessment may be needed.

The sub-cluster "Examination—Procedure" may contain procedural information of the examination conducted as applied pharmaceuticals (contrast/bolus), the used protocols, and annotations.

Applied pharmaceuticals (contrast/bolus) have effects on pixel data and thus are needed to evaluate the pixel data correctly. The used protocols describe the configuration used for this imaging acquisition and is also necessary. Annotations, i.e., automated or manual interpretation of the pixel data, are the base for subsequent analyses.

All this information is not specific for the patient.

With medical knowhow, information about the health status of the patient may be derived from the procedure information because some procedures are specific for the kind of (suspected) disease.

With medical knowhow, the medical condition shown on the pixel data can be derived. Annotations help understanding the findings in the pixel data, also for non-experts.

The information is considered a quasi-identifier as it may give some information about the health status of the patient and thus may indirectly contribute to narrowing down the set of patients.

The sub-cluster "Examination—Text" contains standardized text elements that contain information about the applied procedure (e.g., study or series description, labels) or post-processing objects as segmentations of Radiotherapy (RT) structures). This may be needed for many analyses.

This information contained is similar to the sub-cluster "procedure". It does not contain information about a patient.

All free-text elements have always a residual risk that unexpected values are contained. Therefore, each tag in this sub-cluster may be checked thoroughly.

The information in this sub-cluster contains standardized values. As examinations are also done to exclude some medical conditions, the information is not considered a quasi-identifier.

The sub-cluster "Pixel data" relates to the "image" data itself. In modalities, pixel data is calculated by the device itself based on the physical measurements.

For some projects, also keeping the physical measurements (e.g. "raw data" of the image) itself may be necessary, e.g., to test new algorithms for image calculation.

DICOM studies may contain different "slices" of the image. Using dedicated software, the different slices can be rendered and displayed as 3D images.

Retaining the pixel data is the core requirement for all these research projects. The research projects mostly are focused on improvement of image quality or image analysis and thus blurring the content to reduce the re-identification risk is contradicting the goal of the research project.

Pixel data may contain burned-in textual information about the patient. This is done for instance to improve human readability by post-processing systems. Collection of this types of pixel data may be excluded, for instance the information may be blurred or masked before it is being minimized; this may be enforced by manual checks or semi-automated tests.

There might be some extra-ordinary clinical conditions as very specific stents, specific implants, fractures, or anatomic structures. These very specific conditions help singling out a patient by narrowing the set of potential patients. DICOM studies of these types of patients may be excluded from projects.

The pixel data provide information about the patient that, depending on the body area and disease shown, supports singling out a patient or link the data to other data of the same patient.

For all projects, a general assessment of the re-identification risk of the body area shown may be needed. For this, the frequency of the disease may be considered.

Special attention may be paid to head scans. For head scans, a dedicated project specific risk assessment may be necessary.

Furthermore, it may be avoided, that DICOM studies include pixel data containing direct patient identifiers as burned-in text or very specific clinical conditions that would allow identifying a patient with high probability.

Information of the sub-cluster "Technical data" may be needed for many analyses and for display of pixel data. It may encompass the used acquisition parameters and measurements. Also, DICOM tags as sequences (SQ), i.e. DICOM tags of VR=SQ, used to structure the information in the DICOM studies are contained in this sub-cluster.

The technical data have no relation to the patient and are therefore not considered quasi-identifiers.

In the sub-cluster "Examination—Free Text", DICOM studies may contain comments or other free text information related to the DICOM study or post-processing on the study or accompanying objects of the study specified by the operator.

It cannot be excluded that indirect information about patient or other quasi-identifiers are contained. All the examination free-text DICOM elements are assigned to this sub-cluster. To avoid any risk, these free text values or comments may not be kept.

The sub-cluster "Examination—Others" contains all data not relevant or not required for the use cases, e.g., data for display systems or storage devices, data with content not being clear and not required. This data may not be kept.

The cluster "Others" may contain all other information, i.e., DICOM tags that have been analyzed and do not fall in any of the above clusters and sub-clusters.

In general, (research) projects may also need additional clinical data about the patient, e.g., biopsy results in cancer related projects or lab information as the PCR value in case of prostate examinations. This information may not be stored within the DICOM files. It may need to be linked by the institution to the modified patientID. For these projects, storing a mapping table between the original patientID and the minimized patientID within the sphere of the institution may therefore be required.

Each project may need to check if this additional information is a quasi-identifier and thus needs to be evaluated per project. For example, projects related to prostate examinations need the PCR value. This PCR value is a lab result at the time of the examination which will vary over time. Thus, it does not help singling out patients and is not considered a quasi-identifier.

Article 29 Data Protection Working Party "Opinion 05/2014 on Anonymisation Techniques" describes criteria for the evaluation of anonymization techniques. These criteria may be used to derive the concrete threats for the analysis regarding the risk of re-identifying a patient.

According to the Article 29 WP, the main threats against anonymization are:

Singling out, which corresponds to the possibility to isolate some or all records which identify an individual in the dataset;

Linkability, which is the ability to link, at least, two records concerning the same data subject or a group of data subjects (either in the same database or in two different databases). If an attacker can establish (e.g., via correlation analysis) that two records are assigned to a same group of individuals but cannot single out individuals in this group, the technique provides resistance against "singling out" but not against linkability;

Inference, which is the possibility to deduce, with significant probability, the value of an attribute from the values of a set of other attributes.

According to the approach described herein, a re-identification risk analysis framework is provided which evaluates the quasi-identifiers of a project, which have been identified by grouping them to the DICOM-Tag clusters as described above. It examines combinations of quasi-identifiers, connects this information with additional knowledge a threat source may have, and analyses the re-identification risk considering which means and external information a threat source is likely to use and considering the objective factors that determine this risk value, such as costs, amount of time and the reasonable likelihood of a re-identification attempt.

In the following, techniques for analyzing the probability of singling out a patient are described.

It may be distinguish if the person ("threat source") trying to single out the patient knows the hospital or not.

In principle, pixel data could be used to identify the patient. It might contain patient identifying structures as text or identifying structures (outliers). Some devices generate text information within the pixel data. In this case, the patientID or even the patients' name might be contained. In this case, the patient can be directly identified. Also, pixel data might contain identifying structures (outliers) like unusual implants. This information would allow singling out a patient.

Therefore, for processing pixel data in a project, only pixel data without identifying information may be provided. Thus, after minimization, pixel data may contain no patient identifying structures.

Assuming that the threat source does not know the hospital in which the DICOM study was generated and that the DICOM study does not contain information that allows the threat source to determine the hospital directly or indirectly, the only information about the hospital that might be available is the geographical region of the hospital. The regions may be predefined values covering several countries. Thus, the set of potential patients is very large, it may encompass many millions of persons.

The DICOM study may contain generic information about the used device. Employees of the manufacturer can use this information to restrict the set of potential hospitals. Even if there are only a few hospitals using a specific type of device, the set of potential patients will remain large.

In case device models are not common in the market (e.g., new models, very expensive models, etc.), hospitals using them might be publicly known. In this case, the catchment area used for the risk analysis may consider this.

The patient related quasi-identifiers can be used to restrict the set of potential patients.

The parameters of the examination, the clinical conditions, and the pixel data itself indicating the disease are further quasi-identifiers. The information gained is the disease or suspected disease. To consider the effect of this information, the frequency of the disease (incidence) may be derived from available statistics or estimated.

Using the information (population, patient characteristic, incidence), a check for k-anonymity may be done. The following example shows this for the patients' quasi-identifiers as used in the patient's basic characteristics sub-cluster. In case more or fewer patient characteristics are configured, the estimation may be adapted.

The number of persons in each age category may be calculated using available statistics of the region. Then, the incidence may be used to calculate the distribution in each category. If one category contains less than a fixed number of persons (e.g., k=5), the chosen data minimization may be re-considered. The following table shows an example of a k-anonymization check:

the installed base lists may identify the device of this device model. Thus, the employee could even further narrow down the regions from which the patient probably origins. In this case, the catchment area to be considered is even smaller. Due to the much smaller number of persons, k-anonymity may be hard to achieve.

Singling out a patient based with a high probability shall not be possible. To prove this, a qualitative check may be done as follows. The probability may be estimated that a potential threat agent has access to the minimized DICOM studies,
knows the hospital,
knows a patient who visited this hospital with a matching examination, and
can assign a DICOM study to this patient.

For achieving anonymity, the resulting probability shall be low and the gain of information by a successful linking shall be low or negligible.

Another aspect which may be considered is "Inference". Inference is the possibility of deducing properties of a person with significant probability from the information about the quasi-identifiers and the distribution of their values. In the context of k-anonymity, this means: if the distribution of sensitive data within a sub-cluster is far from the a-priory distribution, then the knowledge that the study of a patient probably belongs is one in this sub-cluster allows to estimate the sensitive data with a higher probability than in the statistical base case. However, if the deviation from the a-priori probabilities is systematic, because there is a relationship between the main object and the values of the sensitive data in the population, then this knowledge increase is not "inference". For instance, if a certain complication is typical for a certain main object, the implication that the patient may have this complication is not a privacy threat.

Within research projects, a plurality of DICOM studies may be selected by a hospital.

Within a project DICOM studies with similar clinical conditions may be analyzed, e.g., COVID-19 lung conditions or lung lesions for AI algorithm development. By this pre-selection the clinical conditions of the DICOM studies may be the same.

| Age groups | 21-23 | 24-26 | 27-29 | 30-32 | 33-35 | 36-38 |
| --- | --- | --- | --- | --- | --- | --- |
| Number of persons (here: numbers for Germany) | 2,700,000 | 2,800,000 | 3,100,000 | 3,300,000 | 3,100,000 | 2,800,000 |
| Number of female or male | 1,350,000 | 1,400,000 | 1,550,000 | 1,650,000 | 1,550,000 | 1,400,000 |
| Incidence in this age group (just a fictional number for illustration) | 5 | 5 | 5 | 10 | 10 | 10 |
| Resulting number of patients | 68 | 70 | 78 | 165 | 155 | 140 |

If the k-anonymization analysis shows enough values in each category, singling out a patient is not possible.

Assuming that the threat source does know the hospital in which the DICOM study was generated. Even if there is no information about the hospital in the DICOM studies itself, persons involved in the project may know the hospital. In this case, the catchment area of the hospital may be evaluated as base of further evaluations.

Furthermore, for DICOM studies generated by a particular manufacturer of a device, an employee having access to If not all DICOM studies with the defined clinical conditions are part of a project, there is no evidence that DICOM studies of a certain patient are part of the data set. Thus, inference has a very low probability/risk.

If all DICOM studies of a certain subgroup are collected, this may be considered in the risk assessment. In this case, it may be analyzed, which additional information about the patient can be deduced.

Assuming it is known that a specific person is part of the dataset. The number of possible matching DICOM studies could be reduced by filtering given criteria (e.g., age of that person and range of weight). This would result in a subgroup of DICOM studies including the study of the given person. To remain with the example of COVID-19, we assume that the dataset contains positive as well as negative studies. The subgroup of DICOM studies gives more information about the probability that this person is positive or negative concerning COVID-19. Presume 90% of this subgroup was tested positive with COVID-19, it can be assumed that the specific person was tested positive by a probability of 90%. The risk of inference can be kept very low.

A further aspect which may be considered is "Linkability". Linkability relates to the probability that the minimized DICOM studies within different scenarios can be linked to other information allowing the identification of a patient.

Assuming that other DICOM studies of the same patient are available.

The data minimization tooling removes all direct patient identifiers and ensures that for a new project new random values for the patientID and the hospital are generated. Therefore, if a DICOM study of a specific patient is collected for different projects, the generated random identifiers for the patient and the hospital are different. Thus, using these identifiers to link different DICOM studies is not possible.

That the same DICOM study is used in different projects is very improbable (because one study is about a particular medical condition and fits probably only into one research question) and shall be avoided, unless the two minimized studies are identical. In other words, the same minimization procedure shall have been used in both projects.

If not, it will be possible to match these DICOM studies by comparing e.g. the pixel data and the technical values, e.g., decimal values as the KVP (Peak kilo voltage output of the X-Ray generator). All this technical data and the pixel data within the DICOM study is kept.

In the same way, this information can be used to match the minimized DICOM study to the original DICOM study. Using the technical data or the pixel data to search in a large data base of DICOM studies is possible in principle but not easy and such a heavy processing of the DICOM Database will be conspicuous and will most surely not go unnoticed. Files will need to be parsed for value combinations of technical data or pixel data will be needed to be compared. Comparison of pixel data can be sped up by first calculating the hash values and the comparing these hash values. But this may succeed only if the two images are identical. Moreover, the effort in these types of attacks is disproportionate to the expected gain in information (as the DICOM original studies already contain all information).

Thus, formally linkability is possible, but no additional information is gained and therefore this is not considered to be an attack against privacy.

Assuming that the patient itself publishes the DICOM study. It may be assumed that the patient is aware that if the study published, it can be accessed and used to link further information.

All unique identifiers within a DICOM study are replaced by data minimization. Thus, they cannot be used to match particular study to a study disclosed on the Internet. As discussed above, technical data or pixel data can be used to link the studies, but no additional information is gained and therefore this is not considered to be an attack against privacy.

For some body regions it has been found that pixel data may be identifying. Most prominent example are 3D head scans that allow reconstruction and comparison with photographs. Reconstructions of head scans can be used by standard face recognition algorithms to match with photographs. Several publications show good results when compared to a restricted set of photographs with a high rate of recognition. That means, if there is already a restricted set of possible patients, by linking these two different data sources, a patient might be identifiable. Thus, head scans may be identifiable and therefore may not be part of a project.

In view of the above, the general problem may be how to identify how the different attributes should be treated, in particular in case of hundreds or thousands of attributes as defined for example in DICOM and in case the amount of attribute varies, for example when new attributes are included.

It has been found that each attribute may be treated (suppressed/abstracted) in a particular way, but many "similar" attributes could be treated in a similar way. In order to set up a data minimization approach for structured data with thousands of different fields (attributes), and to be able to assess the residual re-identification risk after minimization, it may be convenient to cluster the fields that should be treated in a similar way (that is; suppressed or abstracted in a similar way).

A corresponding method may be performed at least partially or to a large amount automatically, for example by a device like a computer system.

FIG. 1 illustrates aspects with respect to a device 100. The device 100 includes a computing device, e.g. a processor 102, and a memory 104. The device 100 also includes an interface 106. For instance, it would be possible that text documents are received in digital form via the interface 106, e.g., from a database 150. The processor 102 can load program code from the memory 104 and execute the program code. Upon loading and executing the program code, the processor 102 can perform one or more of the following: receive via the at least one interface a plurality of text documents relating to the application domain; determine, based on the plurality of text documents, a plurality of text snippets, wherein a text snippet of the one or more text snippets is a text phrase or word contained in the plurality of text documents which is presumably relevant in the application domain; assign to each of the plurality of text snippets a label of a plurality of labels, the label being a word representing the text snippet; receive via the at least one input unit a plurality of main objects in the application domain; cluster the plurality of text snippets and the plurality of labels based on the plurality of main objects for obtaining a plurality of clusters; cluster, within each cluster, the plurality of text snippets with related information in sub-clusters and assigning the labels of the clustered text snippets to the corresponding sub-cluster; for each attribute, assign the attribute to one of the plurality of sub-clusters based on a similarity between (i) at least one of the attribute name and an attribute description of the attribute, and (ii) the plurality of text snippets and the plurality of labels of the sub-clusters, and assess, for each sub-cluster of the plurality of sub-clusters, a corresponding re-identification risk based on value types assigned to the attributes and the attribute descriptions of the attributes assigned to the sub-cluster.

Figure 2:
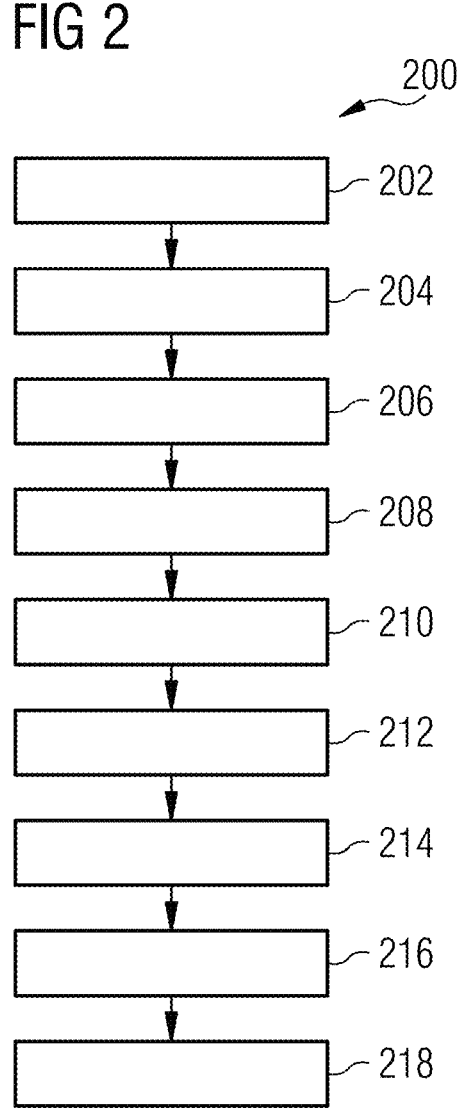
FIG. 2 is a flowchart of a method according to various examples.

FIG. 2 is a flowchart of a method 200 according to various examples. For instance, the method 200 of FIG. 2 could be executed by the processor 102 upon loading program code from the memory 104. The method to 200 comprises method steps 202 to 218. The method steps 202 to 218 may be carried out serially or in parallel. The (preliminary) results of each step may lead to a revision of previous (or posterior) steps.

An application domain, for example the domain of medical and health care, may be described using a set of labels and text snippets. For example, a plurality of text documents relating to the application domain may be provided in step 202. Text snippets can be small documents, text sentences or text phrases or even words. More precisely, it may be necessary to find (mostly short) text snippets and labels that describe the different aspects of:
- the application domain;
- the objects in the application domain;
- the main activities;
- the types of information to be collected.

Many sources of both labels and texts can be directly used, including e.g. Wikipedia, DICOM Manuals, etc. Thus, many readily available sources containing large amounts of labelled or unlabeled data can be used for this purpose. For instance, Wikipedia or the description of the corresponding standard (in the case of DICOM, the pages in http://medical.nema.org/standard.html) can be used for these purposes. Based on the plurality of text documents, a plurality of text snippets is determined, wherein each text snippet is a text phrase or word contained in the plurality of text documents which is presumably relevant in the application domain (step 204).

To each of the plurality of text snippets a label of a plurality of labels is assigned in step 206. Each label is a word representing the assigned text snippets. As standards already have structures, it is convenient to use the information in the standards for an initial labelling, and for an initial assignment of attributes to clusters as described below in connection with step 214. Even unlabeled text, like Wikipedia uses text marks to emphasize particular words, e.g. with hyperlinks, italics or bold, which have a good chance of providing good labels for the texts. Even without labels there are well-known algorithms for separating the text snippets and labelling, e.g. cluster labeling techniques.

Main objects available in the application domain are identified in step 208, e.g. based on expert knowledge. Main objects may be physical objects (for instance, technical objects, buildings or parts of building), institutions (hospital, museum, etc.), persons (identifiable or not, groups or roles of persons, like doctor, patient, etc.) events (like examination). This step can be fully manual, fully automated or machine-assisted.

In the medical and health care domain, in particular in view of the DICOM standards, main objects may comprise as discussed above (without being restricted to these examples):
- Patient, e.g. all information about the patient himself, demographics, his family, physical constitution, etc.;
- Visit and Examination, e.g. type and conditions of the visit and hospital stay, admittance date, discharge date, visit comments;
- Institution, e.g. Hospital, department, lab, etc.;
- Device, e.g. type of device, identifier, software, etc.;
- Analysis and Results, e.g. vital signs, diagnosis, medical information or comments, etc.

In step 210, the texts and labels are organized in clusters, that is, in groups that relate directly to the same main object. A plurality of clusters is obtained, wherein each cluster may comprise spatially and/or context related text snippets in one document of the plurality of text documents.

Clusters may be characterized by sets of representative labels. The task of assigning a set of labels to each individual cluster in a document organization is known as cluster labeling. See for instance "Hanieh Poostchi and Massimo Piccardi. 2018. Cluster Labeling by Word Embeddings and WordNet's Hypernymy. In Proceedings of Australasian Language Technology Association Workshop, pages 66-70". A related set of algorithms that can be sued is word embeddings, see for instance "Wang, Yanshan, et al. "A comparison of word embeddings for the biomedical natural language processing." Journal of biomedical informatics 87 (2018): 12-20".

Thus, text snippets and labels are grouped in clusters and each cluster is described by several labels and several text snippets.

In steps 208 and 210, the labels and text snippets may be condensed and aggregated to identify the main objects available in the application domain. Thus, a hierarchical approach is applied on the set of labels to partition them into a hierarchy of clusters (according to the main objects) and sub-clusters. This can be done using standard clustering algorithms as discussed in "Hanieh Poostchi and Massimo Piccardi. 2018. Cluster Labeling by Word Embeddings and WordNet's Hypernymy. In Proceedings of Australasian Language Technology Association Workshop, pages 66-70". A main criterion may be to end up with about 5-12 main objects and correspondingly with 5-12 clusters with main labels that represent the objects, that means one main label for each object, but there may be more labels. A manual revision of this step or the manual inclusion of objects could be helpful but is not necessary.

The attributes with similar kind of information are grouped in sub-clusters. For example, in step 214, each attribute is assigned to a sub-clusters based on a similarity between (i) at least one of the attribute name and an attribute description of the attribute, and (ii) the plurality of text snippets and the plurality of labels of the cluster.

As an example, for DICOM the following are particular sub-clusters may be identified:
concerning the main object "Patient":
  identifiers
  demographics (including age, gender, ethnic group, weight, height)
  family, relative, friends, tutor, etc
  address, telephone number
concerning the main object "Visit and Examination":
  type of visit
  conditions of the visit and/or hospital stay
  admittance and discharge dates
  visit comments
concerning the main object "Institution":
  Hospital, department, lab, etc
  City
  Institution personnel
concerning the main object "Device":
  Manufacturer
  Model and type of device
  Identifier
  SW and HW Configuration
concerning the main object "Analysis and Results":
  Vital signs
  Captured information and images
  Diagnosis
  Medical information or comments created during the analysis in the institution.

Steps 212 to 214 may comprise two inter-related tasks:
for each main object, identify the sub-clusters and their corresponding labels
assign the attributes of the standard to the sub-clusters.
For this, the steps 202 to 208 may be repeated again within each of the main objects: the text snippets with similar kind of information are grouped in sub-clusters and those sub-clusters are labelled.

The different attributes of the standard may be assigned according to the labels of the clusters and sub-clusters. Supervised machine learning methods can be used to find the best label for a given input sequence, a problem known as sequence labeling problem. Well know procedures for this step are Conditional Random Fields (CRFs), Maximum Entropy (ME), and Structural Support Vector Machines (SSVMs). A guiding principle may be that attributes of the same type (identifiers, dates, free text) should be as far as possible, be classified inside the same sub-cluster. The information about the value type and a short description of the contents of the attributes in the DICOM standard is found in the Registry of DICOM Data Elements (see e.g. DICOM PS3.6 2022b—Data Dictionary; DICOM Standards Committee; Copyright ©2022 NEMA). "VR" (value representation) is the value type of the attribute, which gives a clear indication if the attribute is a date or a free text, etc. The word "ID" or "identification" in the Keyword or in the Description generally distinguishes the identifiers.

Besides DICOM, other health information standards are treated in a very similar way: FHIR and HL7 (and to a minor extent, also CCD, ICD-9, ICD-10).

In step 216, for each sub-cluster, a corresponding re-identification risk is assessed based on value types assigned to the attributes and the attribute descriptions of the attributes assigned to the sub-cluster.

Optionally, in step 218, the value types assigned to the attributes may be adapted and for each sub-cluster a corresponding re-identification risk may be re-assessed based on the adapted value types and the attribute descriptions of the attributes assigned to the sub-cluster. The goal of this adaption of the value types may be to achieve a suitable number of patients per sub-cluster.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

As a result, the above described method enables a grouping of the attributes of all objects in the application domain, so that they can be treated together in a data minimization step, in a way that the re-identification risk can be easily evaluated. The method can be performed fully automatically or can be done fully manually, but it is very convenient to have an automatic method that is later evaluated by an expert. The procedure comprises several interrelated steps:

Identifying texts that describe the application domain.
Objects related to the application domain are identified.
The texts and labels are grouped into clusters, relating to the identified objects.
The attributes are assigned to the clusters and each cluster is sub-divided into sub-clusters making the evaluation of re-identification risk more amenable.

The analysis of the re-identification risk is based on the sub-clusters. Thus, the risk evaluation is manageable, as the number of sub-clusters is much smaller than the number of attributes, thus eliminating the need to evaluate thousands of single attributes.

The structured approach helps to make the risk evaluation more transparent. The reasoning in the evaluation can be easily comprehended and thus weaknesses will be detected early and avoid data breaches.

The clusters and sub-clusters can be described such that new attributes can be easily assigned to a sub-cluster; an automated first assignment is possible. Further, assignment can be done by persons not experts in the field of anonymization. If an existing sub-cluster can be used, there is no need to adapt the re-identification risk evaluation. This provides an efficient and robust mechanism for adaption of new attributes for the purpose of data minimization and assessment of appropriate re-identification risk.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

The invention claimed is:

1. A computer-implemented method for assessing a person re-identification risk in an application domain in which for each of a plurality of persons a corresponding personal record is stored in a database, each personal record comprising a set of attributes, each attribute comprising a corresponding attribute name and a corresponding attribute value, the method comprising:
   providing a plurality of text documents relating to the application domain;
   automatically determining, based on the plurality of text documents, a plurality of text snippets, wherein a text snippet of the plurality of text snippets is a text phrase or word contained in the plurality of text documents;
   automatically assigning to each of the plurality of text snippets a label of a plurality of labels, the label being a word representing the text snippet;
   providing a plurality of main objects in the application domain;
   automatically clustering the plurality of text snippets and the plurality of labels based on the plurality of main objects for obtaining a plurality of clusters;
   automatically clustering, within each cluster of the plurality of clusters, the plurality of text snippets with related information in sub-clusters and assigning the labels of the clustered text snippets to the corresponding sub-cluster;
   for each attribute, automatically assigning the attribute to one of the sub-clusters based on a similarity between (i) at least one of the attribute name or an attribute description of the attribute, and (ii) the plurality of text snippets and the plurality of labels of the sub-clusters; and assessing, for each sub-cluster, a corresponding re-identification risk based on value types assigned to the attributes and the attribute descriptions of the attributes assigned to the sub-cluster.

2. The method of claim 1, wherein the method further comprises:

adapting the value types assigned to the attributes and re-assessing for each sub-cluster the corresponding re-identification risk based on the adapted value types and the attribute descriptions of the attributes assigned to the sub-cluster.

3. The method of claim 2, wherein the assigning the attribute to one of the sub-clusters comprises determining, for each sub-cluster, a semantic similarity measure between (i) at least one of the attribute name or the attribute description of the attribute, and (ii) the plurality of text snippets and the plurality of labels of the sub-cluster, and assigning the attribute to the sub-cluster for which the greatest semantic similarity measure was determined.

4. The method of claim 3, wherein the determining the text snippets determines text snippets relating to at least one of:

a clinical domain covered in the plurality of text documents, an object of a clinical domain covered in the plurality of text documents, an activity of a clinical domain covered in the plurality of text documents, or a type of information to be collected in a clinical domain covered in the plurality of text documents.

5. The method of claim 4, wherein the determining the text snippets and the assigning the labels is performed using machine learning techniques with the plurality of text documents as an input.

6. The method of claim 5, wherein the plurality of main objects include at least one of:

patient information, visit and examination information, institution information, device information, or analysis and result information.

7. The method of claim 6, wherein the method further comprises:

removing a particular sub-cluster when less than a predefined number of attributes is assigned to that particular sub-cluster.

8. The method of claim 1, wherein the assigning the attribute to one of the sub-clusters comprises determining, for each sub-cluster, a semantic similarity measure between (i) at least one of the attribute name or the attribute description of the attribute, and (ii) the plurality of text snippets and the plurality of labels of the sub-cluster, and assigning the attribute to the sub-cluster for which the greatest semantic similarity measure was determined.

9. The method of claim 1, wherein the determining the text snippets determines text snippets relating to at least one of:

a clinical domain covered in the plurality of text documents, an object of a clinical domain covered in the plurality of text documents, an activity of a clinical domain covered in the plurality of text documents, or a type of information to be collected in a clinical domain covered in the plurality of text documents.

10. The method of claim 1, wherein the determining the text snippets and the assigning the labels is performed using machine learning techniques with the plurality of text documents as an input.

11. The method of claim 1, wherein the plurality of main objects include at least one of:

patient information, visit and examination information, institution information, device information, or analysis and result information.

12. The method of claim 1, wherein the method further comprises:

removing a particular sub-cluster when less than a predefined number of attributes is assigned to that particular sub-cluster.

13. The method of claim 1, wherein the method further comprises:

merging a first sub-cluster of the sub-clusters and a second sub-cluster of the sub-clusters when a semantic similarity measure between the attributes assigned to the first sub-cluster and the attributes assigned to the second sub-cluster is greater than a predefined threshold.

14. The method of claim 1, wherein each sub-cluster comprises text snippets and labels having a semantic similarity measure above a selected threshold, wherein the threshold is selected such that a number of sub-clusters is in a predefined target range.

15. The method of claim 14, wherein the predefined target range is 20 to 100 sub-clusters.

16. The method of claim 1, further comprising:

assessing the assignment of the attributes to the sub-clusters by verifying whether similar data minimization algorithms are applicable to the attributes assigned to one sub-cluster.

17. The method of claim 1, wherein the assigning the attributes to the sub-clusters is performed using machine learning techniques with (i) at least one of the attribute name or the attribute description of the attributes, and (ii) the plurality of text snippets and the plurality of labels of the sub-clusters as an input.

18. A non-transitory computer program product comprising computer readable program code that, when executed by a computing device, cause the computing device to perform the method of claim 1.

19. A non-transitory computer-readable recording medium comprising computer readable program code that, when executed by a computing device, cause the computing device to perform the method of claim 1.

20. An apparatus for assessing a person re-identification risk in an application domain in which for each of a plurality of persons a corresponding personal record is stored in a database, each personal record comprising a set of attributes, each attribute comprising a corresponding attribute name and a corresponding attribute value, the apparatus comprising:

at least one interface;

at least one memory configured to store instructions; and at least one processor configured to execute the instructions to cause the apparatus to receive via the at least one interface a plurality of text documents relating to the application domain, determine, based on the plurality of text documents, a plurality of text snippets, wherein a text snippet of the plurality of text snippets is a text phrase or word contained in the plurality of text documents which is presumably relevant in the application domain, assign to each of the plurality of text snippets a label of a plurality of labels, the label being a word representing the text snippet, receive via the at least one interface a plurality of main objects in the application domain, cluster the plurality of text snippets and the plurality of labels based on the plurality of main objects for obtaining a plurality of clusters, cluster, within each cluster of the plurality of clusters, the plurality of text snippets with related information in sub-clusters and assigning the labels of the clustered text snippets to the corresponding sub-cluster, for each attribute, assign the attribute to one of the sub-clusters based on a similarity between (i) at least one of the attribute name and an attribute description of the attribute, and (ii) the plurality of text snippets and the plurality of labels of the sub-clusters, and assess, for each sub-cluster, a corresponding re-identification risk based on value types assigned to the attributes and the attribute descriptions of the attributes assigned to the sub-cluster.

\* \* \* \* \*